(12) United States Patent
Raghavan et al.

(10) Patent No.: US 11,929,813 B1
(45) Date of Patent: Mar. 12, 2024

(54) DYNAMIC ANTENNA SET SWITCHING FOR INTERFERENCE MITIGATION

(71) Applicant: QUALCOMM Incorporated, San Diego, CA (US)

(72) Inventors: Vasanthan Raghavan, West Windsor Township, NJ (US); Yu-Chin Ou, San Diego, CA (US); Mohammad Ali Tassoudji, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 15 days.

(21) Appl. No.: 17/934,548

(22) Filed: Sep. 22, 2022

(51) Int. Cl.
*H04B 7/06* (2006.01)
*H04B 7/08* (2006.01)

(52) U.S. Cl.
CPC ......... *H04B 7/0691* (2013.01); *H04B 7/0602* (2013.01); *H04B 7/0857* (2013.01)

(58) Field of Classification Search
CPC ... H04B 7/0691; H04B 7/0602; H04B 7/0857
USPC ................................ 375/267, 299, 347, 349
See application file for complete search history.

(56) References Cited

U.S. PATENT DOCUMENTS

| | | | | |
|---|---|---|---|---|
| 2012/0068882 | A1* | 3/2012 | Blachford | H01Q 3/2605 |
| | | | | 342/104 |
| 2019/0324136 | A1* | 10/2019 | Amadjikpe | G01S 13/70 |
| 2021/0249768 | A1* | 8/2021 | Ioffe | H01Q 21/06 |
| 2021/0408660 | A1* | 12/2021 | Verwoerd | G07C 1/22 |
| 2023/0216599 | A1* | 7/2023 | Ozozlu | H04J 11/00 |
| | | | | 370/464 |
| 2023/0350057 | A1* | 11/2023 | Tanimoto | G01S 13/343 |

* cited by examiner

*Primary Examiner* — Emmanuel Bayard
(74) *Attorney, Agent, or Firm* — Harrity & Harrity, LLP

(57) ABSTRACT

Various aspects of the present disclosure generally relate to wireless communication. In some aspects, a network node may communicate, using a first set of active antenna elements of an antenna array, during a first time period. The network node may activate a second set of active antenna elements based on a dynamic antenna set switching scheme, wherein the second set of active antenna elements includes at least one active antenna element not included in the first set, wherein a difference between a first main lobe property and a second main lobe property satisfies a main lobe threshold, and wherein a difference between a first side lobe property and a second side lobe property satisfies a side lobe threshold. The network node may communicate, using the second set of active antenna elements, during a second time period. Numerous other aspects are described.

30 Claims, 6 Drawing Sheets

DYNAMIC ANTENNA SET SWITCHING FOR INTERFERENCE MITIGATION

FIELD OF THE DISCLOSURE

Aspects of the present disclosure generally relate to wireless communication and to techniques and apparatuses for dynamic antenna set switching for interference mitigation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a network node for wireless communication. The network node may include a memory and one or more processors coupled to the memory. The one or more processors may be configured to communicate, using a first set of active antenna elements of an antenna array, during a first time period. The one or more processors may be configured to activate a second set of active antenna elements of the antenna array based on a dynamic antenna set switching scheme, wherein the second set of active antenna elements includes a quantity of antenna elements equal to a quantity of antenna elements in the first set, wherein the second set of antenna elements includes at least one active antenna element not included in the first set, wherein a difference between a first set of main lobe properties corresponding to the first set of active antenna elements and a second set of main lobe properties corresponding to the second set of active antenna elements satisfies a main lobe threshold, and wherein a difference between a first set of side lobe properties corresponding to the first set of active antenna elements and a second set of side lobe properties corresponding to the second set of active antenna elements satisfies a side lobe threshold. The one or more processors may be configured to communicate, using the second set of active antenna elements, during a second time period. The above described can be performed with any number of different sets of active antenna elements over a number of time periods.

Some aspects described herein relate to a method of wireless communication performed by an apparatus at a network node. The method may include communicating, using a first set of active antenna elements of an antenna array, during a first time period. The method may include activating a second set of active antenna elements of the antenna array based on a dynamic antenna set switching scheme, wherein the second set of active antenna elements includes at least one active antenna element not included in the first set, wherein a difference between a first set of main lobe properties corresponding to the first set of active antenna elements and a second set of main lobe properties corresponding to the second set of active antenna elements satisfies a main lobe threshold, and wherein a difference between a first set of side lobe properties corresponding to the first set of active antenna elements and a second set of side lobe properties corresponding to the second set of active antenna elements satisfies a side lobe threshold. The method may include communicating, using the second set of active antenna elements, during a second time period.

Some aspects described herein relate to a non-transitory computer-readable medium that stores a set of instructions for wireless communication by a network node. The set of instructions, when executed by one or more processors of the network node, may cause the network node to communicate, using a first set of active antenna elements of an antenna array, during a first time period. The set of instructions, when executed by one or more processors of the network node, may cause the network node to activate a second set of active antenna elements of the antenna array based on a dynamic antenna set switching scheme, wherein the second set of active antenna elements includes at least one active antenna element not included in the first set, wherein a difference between a first set of main lobe properties corresponding to the first set of active antenna elements and a second set of main lobe properties corresponding to the second set of active antenna elements satisfies a main lobe threshold, and wherein a difference between a first set of side lobe properties corresponding to the first set of active antenna elements and a second set of side lobe properties corresponding to the second set of active antenna elements satisfies a side lobe threshold. The set of instructions, when executed by one or more processors of the network node, may cause the network node to communicate, using the second set of active antenna elements, during a second time period.

Some aspects described herein relate to an apparatus for wireless communication. The apparatus may include means for communicating, using a first set of active antenna elements of an antenna array, during a first time period. The apparatus may include means for activating a second set of active antenna elements of the antenna array based on a dynamic antenna set switching scheme, wherein the second set of active antenna elements includes at least one active antenna element not included in the first set, wherein a difference between a first set of main lobe properties corresponding to the first set of active antenna elements and a second set of main lobe properties corresponding to the second set of active antenna elements satisfies a main lobe threshold, and wherein a difference between a first set of side lobe properties corresponding to the first set of active antenna elements and a second set of side lobe properties corresponding to the second set of active antenna elements satisfies a side lobe threshold. The apparatus may include means for communicating, using the second set of active antenna elements, during a second time period.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
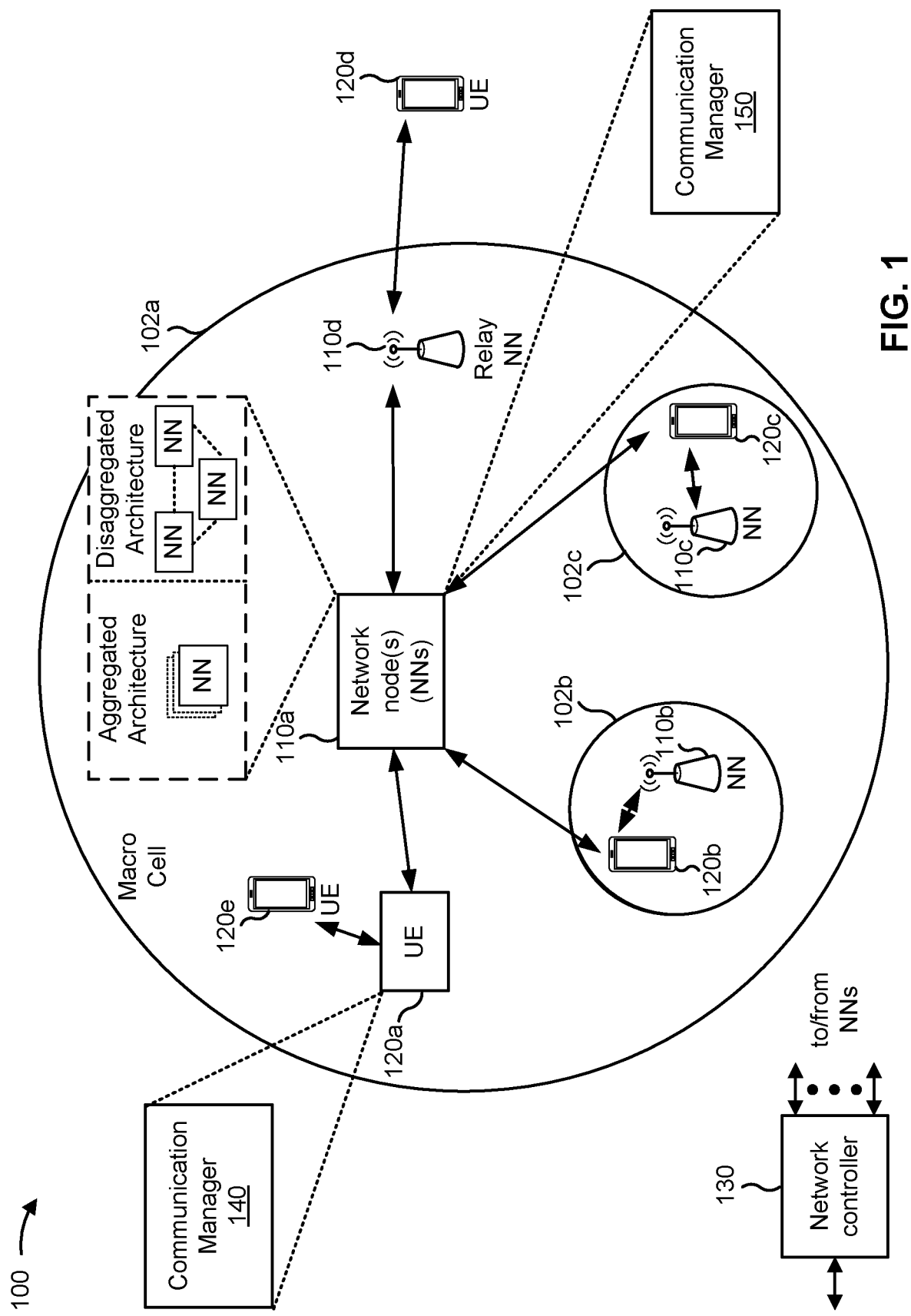
FIG. 1 is a diagram illustrating an example of a wireless network, in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Aspects and examples generally include a method, apparatus, network node, system, computer program product, non-transitory computer-readable medium, user equipment, base station, wireless communication device, and/or processing system as described or substantially described herein with reference to and as illustrated by the drawings and specification.

This disclosure may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, are better understood from the following description when considered in connection with the accompanying figures. Each of the figures is provided for the purposes of illustration and description, and not as a definition of the limits of the claims.

While aspects are described in the present disclosure by illustration to some examples, such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component-based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). Aspects described herein may be practiced in a wide variety of devices, components, systems, distributed arrangements, and/or end-user devices of varying size, shape, and constitution.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the network node 110 may include a communication manager 140 or a communication manager 150. As described in more detail elsewhere herein, the communication manager 140 and/or 150 may communicate, using a first set of active antenna elements of an antenna array, during a first time period; activate a second set of active antenna elements of the antenna array based on a dynamic antenna set switching scheme, wherein the second set of active antenna elements includes at least one active antenna element not included in the first set, wherein a difference between a first set of main lobe properties corresponding to the first set of active antenna elements and a second set of main lobe properties corresponding to the second set of active antenna elements satisfies a main lobe threshold, and wherein a difference between a first set of side lobe properties corresponding to the first set of active antenna elements and a second set of side lobe properties corresponding to the second set of active antenna elements satisfies a side lobe threshold; and communicate, using the second set of active antenna elements, during a second time period. Additionally, or alternatively, the communication manager 140 and/or 150 may perform one or more other operations described herein.

As indicated above, FIG. 1 is provided as an example. Other examples may differ from what is described with regard to FIG. 1.

Figure 2:
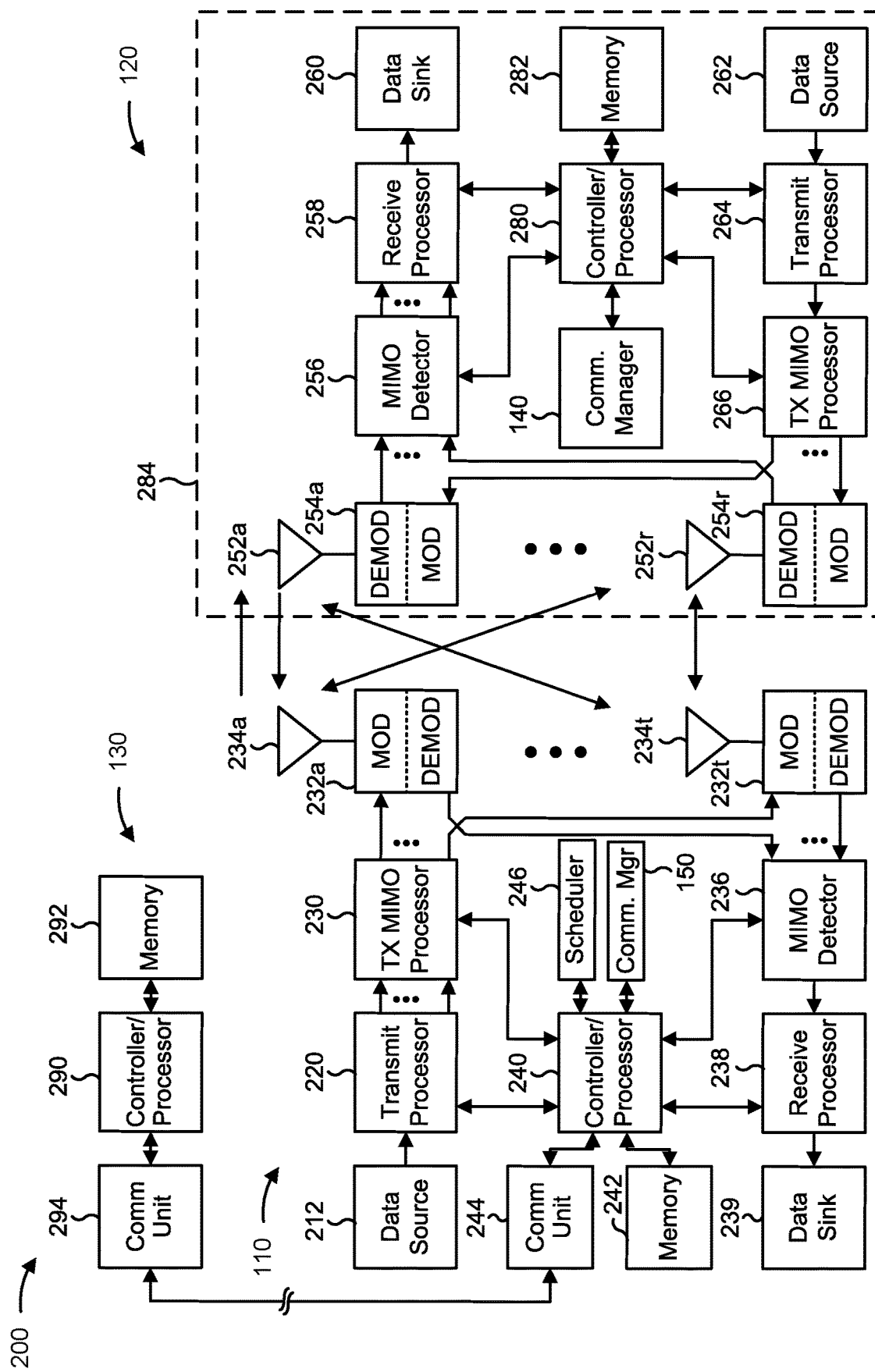
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

Each of the antenna elements may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, or other types of antennas arranged in a linear pattern, a two-dimensional pattern, or another pattern. A spacing between antenna elements may be such that signals with a desired wavelength transmitted separately by the antenna elements may interact or interfere (e.g., to form a desired beam). For example, given an expected range of wavelengths or frequencies, the spacing may provide a quarter wavelength, half wavelength, or other fraction of a wavelength of spacing between neighboring antenna elements to allow for interaction or interference of signals transmitted by the separate antenna elements within that expected range.

Antenna elements and/or sub-elements may be used to generate beams. "Beam" may refer to a directional transmission such as a wireless signal that is transmitted in a direction of a receiving device. A beam may include a directional signal, a direction associated with a signal, a set of directional resources associated with a signal (e.g., angle of arrival, horizontal direction, vertical direction), and/or a set of parameters that indicate one or more aspects of a directional signal, a direction associated with a signal, and/or a set of directional resources associated with a signal.

As indicated above, antenna elements and/or sub-elements may be used to generate beams. For example, antenna elements may be individually selected or deselected for transmission of a signal (or signals) by controlling an amplitude of one or more corresponding amplifiers. Beamforming includes generation of a beam using multiple signals on different antenna elements, where one or more, or all, of the multiple signals are shifted in phase relative to each other. The formed beam may carry physical or higher layer reference signals or information. As each signal of the multiple signals is radiated from a respective antenna element, the radiated signals interact, interfere (constructive and destructive interference), and amplify each other to form a resulting beam. The shape (such as the amplitude, width, and/or presence of side lobes) and the direction (such as an angle of the beam relative to a surface of an antenna array) can be dynamically controlled by modifying the phase shifts or phase offsets of the multiple signals relative to each other.

Beamforming may be used for communications between a UE and a base station, such as for millimeter wave communications and/or the like. In such a case, the base station may provide the UE with a configuration of transmission configuration indicator (TCI) states that respectively indicate beams that may be used by the UE, such as for receiving a physical downlink shared channel (PDSCH). The base station may indicate an activated TCI state to the UE, which the UE may use to select a beam for receiving the PDSCH.

A beam indication may be, or include, a TCI state information element, a beam identifier (ID), spatial relation information, a TCI state ID, a closed loop index, a panel ID, a TRP ID, and/or a sounding reference signal (SRS) set ID, among other examples. A TCI state information element (referred to as a TCI state herein) may indicate information associated with a beam such as a downlink beam. For example, the TCI state information element may indicate a TCI state identification (e.g., a tci-StateID), a quasi-co-location (QCL) type (e.g., a qcl-Type 1, qcl-Type2, qcl-TypeA, qcl-TypeB, qcl-TypeC, qcl-TypeD, and/or the like), a cell identification (e.g., a ServCellIndex), a bandwidth part identification (bwp-Id), a reference signal identification such as a CSI-RS (e.g., an NZP-CSI-RS-ResourceId, an SSB-Index, and/or the like), and/or the like. Spatial relation information may similarly indicate information associated with an uplink beam.

The beam indication may be a joint or separate downlink (DL)/uplink (UL) beam indication in a unified TCI framework. In some cases, the network may support layer 1 (L1)-based beam indication using at least UE-specific (unicast) downlink control information (DCI) to indicate joint or separate DL/UL beam indications from active TCI states. In some cases, existing DCI formats 1_1 and/or 1_2 may be reused for beam indication. The network may include a support mechanism for a UE to acknowledge successful decoding of a beam indication. For example, the acknowledgment/negative acknowledgment (ACK/NACK) of the PDSCH scheduled by the DCI carrying the beam indication may be also used as an ACK for the DCI.

Beam indications may be provided for carrier aggregation (CA) scenarios. In a unified TCI framework, information the network may support common TCI state ID update and activation to provide common QCL and/or common UL transmission spatial filter or filters across a set of configured component carriers (CCs). This type of beam indication may apply to intra-band CA, as well as to joint DL/UL and separate DL/UL beam indications. The common TCI state ID may imply that one reference signal (RS) determined according to the TCI state(s) indicated by a common TCI state ID is used to provide QCL Type-D indication and to determine UL transmission spatial filters across the set of configured CCs.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-6).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-6).

In some aspects, the controller/processor 280 may be a component of a processing system. A processing system may generally be a system or a series of machines or components that receives inputs and processes the inputs to produce a set of outputs (which may be passed to other systems or components of, for example, the UE 120). For example, a processing system of the UE 120 may be a system that includes the various other components or subcomponents of the UE 120.

The processing system of the UE 120 may interface with one or more other components of the UE 120, may process information received from one or more other components (such as inputs or signals), or may output information to one or more other components. For example, a chip or modem of the UE 120 may include a processing system, a first interface to receive or obtain information, and a second interface to output, transmit, or provide information. In some examples, the first interface may be an interface between the processing system of the chip or modem and a receiver, such that the UE 120 may receive information or signal inputs, and the information may be passed to the processing system. In some examples, the second interface may be an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit, or provide information.

In some aspects, the controller/processor 240 may be a component of a processing system. A processing system may generally be a system or a series of machines or components that receives inputs and processes the inputs to produce a set of outputs (which may be passed to other systems or components of, for example, the network node 110). For example, a processing system of the network node 110 may be a system that includes the various other components or subcomponents of the network node 110.

The processing system of the network node 110 may interface with one or more other components of the network node 110, may process information received from one or more other components (such as inputs or signals), or may output information to one or more other components. For example, a chip or modem of the network node 110 may include a processing system, a first interface to receive or obtain information, and a second interface to output, transmit, or provide information. In some examples, the first interface may be an interface between the processing system of the chip or modem and a receiver, such that the network node 110 may receive information or signal inputs, and the information may be passed to the processing system. In some examples, the second interface may be an interface between the processing system of the chip or modem and a transmitter, such that the network node 110 may transmit information output from the chip or modem. A person having ordinary skill in the art will readily recognize that the second interface also may obtain or receive information or signal inputs, and the first interface also may output, transmit, or provide information.

The controller/processor 240 of the network node 110, the controller/processor 280 of the UE 120, and/or any other component(s) of FIG. 2 may perform one or more techniques associated with dynamic antenna set switching, as described in more detail elsewhere herein. In some aspects, the network node described herein is the network node 110, is included in the network node 110, or includes one or more components of the network node 110 shown in FIG. 2. In some aspects, the network node described herein is the UE 120, is included in the UE 120, or includes one or more components of the UE 120 shown in FIG. 2. For example, the controller/processor 240 of the network node 110, the controller/processor 280 of the UE 120, and/or any other component(s) of FIG. 2 may perform or direct operations of, for example, process 500 of FIG. 5 and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 500 of FIG. 5 and/or other processes as described herein. In some examples, executing instructions may include running the instructions, converting the instructions, compiling the instructions, and/or interpreting the instructions, among other examples.

In some aspects, the network node 110 includes means for communicating, using a first set of active antenna elements of an antenna array, during a first time period; means for activating a second set of active antenna elements of the antenna array based on a dynamic antenna set switching scheme, wherein the second set of active antenna elements includes at least one active antenna element not included in the first set, wherein a difference between a first set of main lobe properties corresponding to the first set of active antenna elements and a second set of main lobe properties corresponding to the second set of active antenna elements satisfies a main lobe threshold, and wherein a difference between a first set of side lobe properties corresponding to the first set of active antenna elements and a second set of side lobe properties corresponding to the second set of active antenna elements satisfies a side lobe threshold; and/or means for communicating, using the second set of active antenna elements, during a second time period. The means for the network node 110 to perform operations described herein may include, for example, one or more of communication manager 140, transmit processor 264, TX MIMO processor 266, modem 254, antenna 252, MIMO detector 256, receive processor 258, controller/processor 280, memory 282, communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
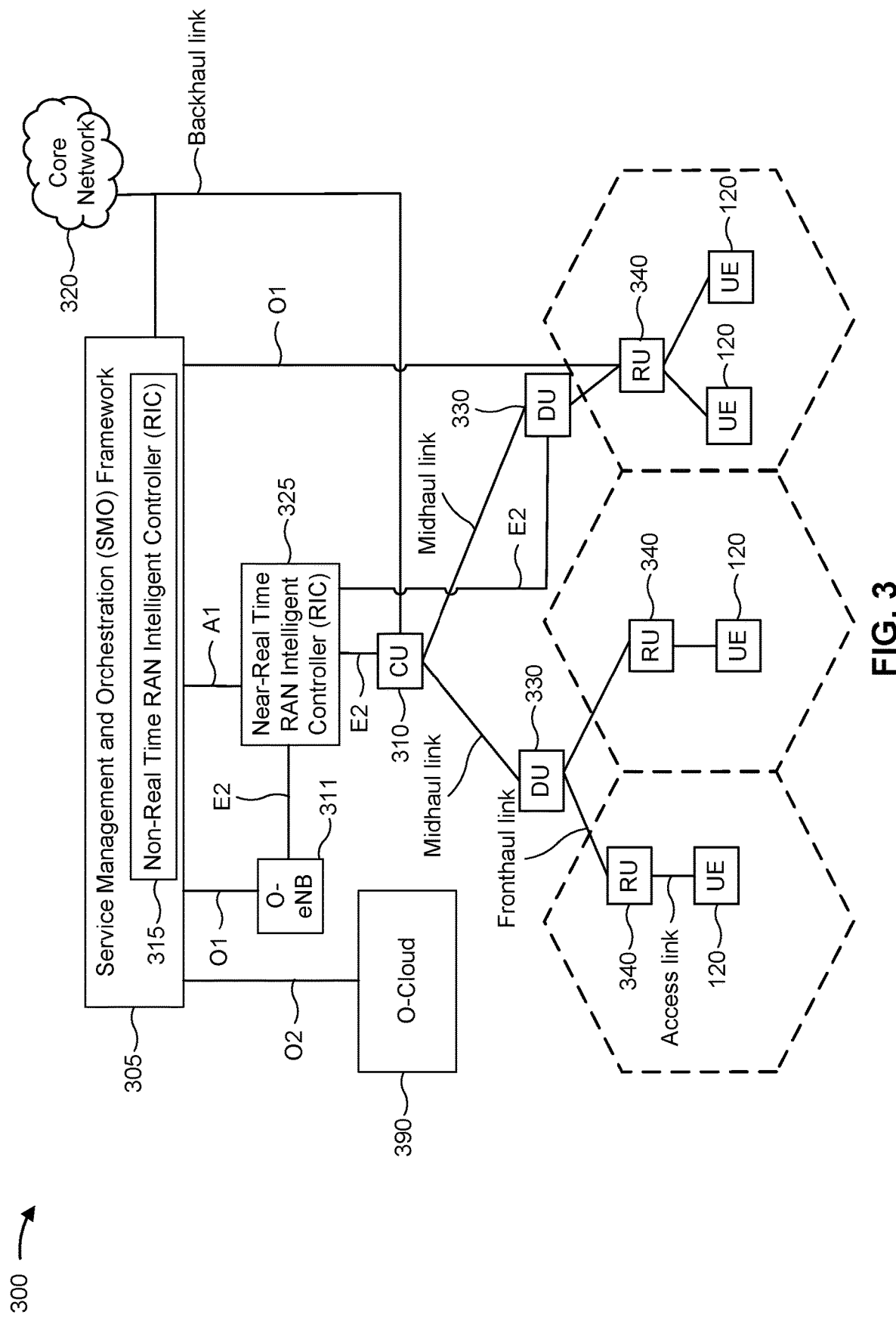
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

As larger antenna arrays are being implemented at network nodes, radiation generated by the antenna arrays can cause interference to other network nodes and/or other electronic devices operating in the vicinity of the network nodes. For example, millimeter wave carrier frequencies that use large antenna arrays (e.g., antenna arrays having greater than or equal to 64 antenna elements) can cause interference to other existing services and operations. As carrier frequencies increase, even more antenna elements can be used in FR4/5 at network nodes such as gNBs and UEs. Additionally, infra nodes (e.g., repeaters, relays, intelligent reflective surface (IRS) nodes, and/or IAB nodes, among other examples) can be introduced into dense networks. Thus, interference generated by the network nodes to existing service and/or operations may fail compliance requirements and/or may negatively impact network performance.

Some aspects of the techniques and apparatuses described herein may include dynamically activating sets of antenna elements according to a dynamic antenna switching scheme that is configured to facilitate providing an antenna panel performance that is at least partially consistent at a main lobe, while the performance at the side lobes varies. In some aspects, for example, each set of active antenna elements may have a same quantity of antenna elements, but different antenna elements. In some cases, the sets may be randomly selected and, in other cases, the sets may be selected based on configuration, indication, and/or one or more antenna element selection rules.

By varying one or more properties of the side lobes, interference may be mitigated via time-averaging. For example, by varying the one or more properties of the side lobes, a network node may not observe a sustained interference over a long period of time as the active set of antenna elements is dynamically changed with time. It has been observed that switching active antenna elements results in minimal change in the main lobe properties of discrete Fourier transform (DFT) beam codebooks, while altering the side lobe properties of the DFT beam codebooks. Time-averaging of the side lobe properties can lead to mitigated interference levels. Since one or more properties of the main lobes may vary within threshold differences, consistent and reliable communication channels may be provided while mitigating the interference from the side lobes.

Some aspects of the techniques described herein may be used, for example, to facilitate operating a radio altimeter within a desired interference sensitivity. Radio altimeters in aircraft may operate in a 4.2-4.4 GHz range and, in areas in which cellular services are operating in the 5G C-band (3.98-4.2 GHz), there may be leakage of radiation from the cellular services (e.g., from gNBs) to the radio altimeters, which may lead to poor performance of the radio altimeters. By dynamically switching the sets of active antenna elements of network nodes operating in the 5G C-band, interference may be mitigated, thereby reducing the interference impact on radio altimeters and radio altimeters may stay within desired interference sensitivities.

Figure 4:
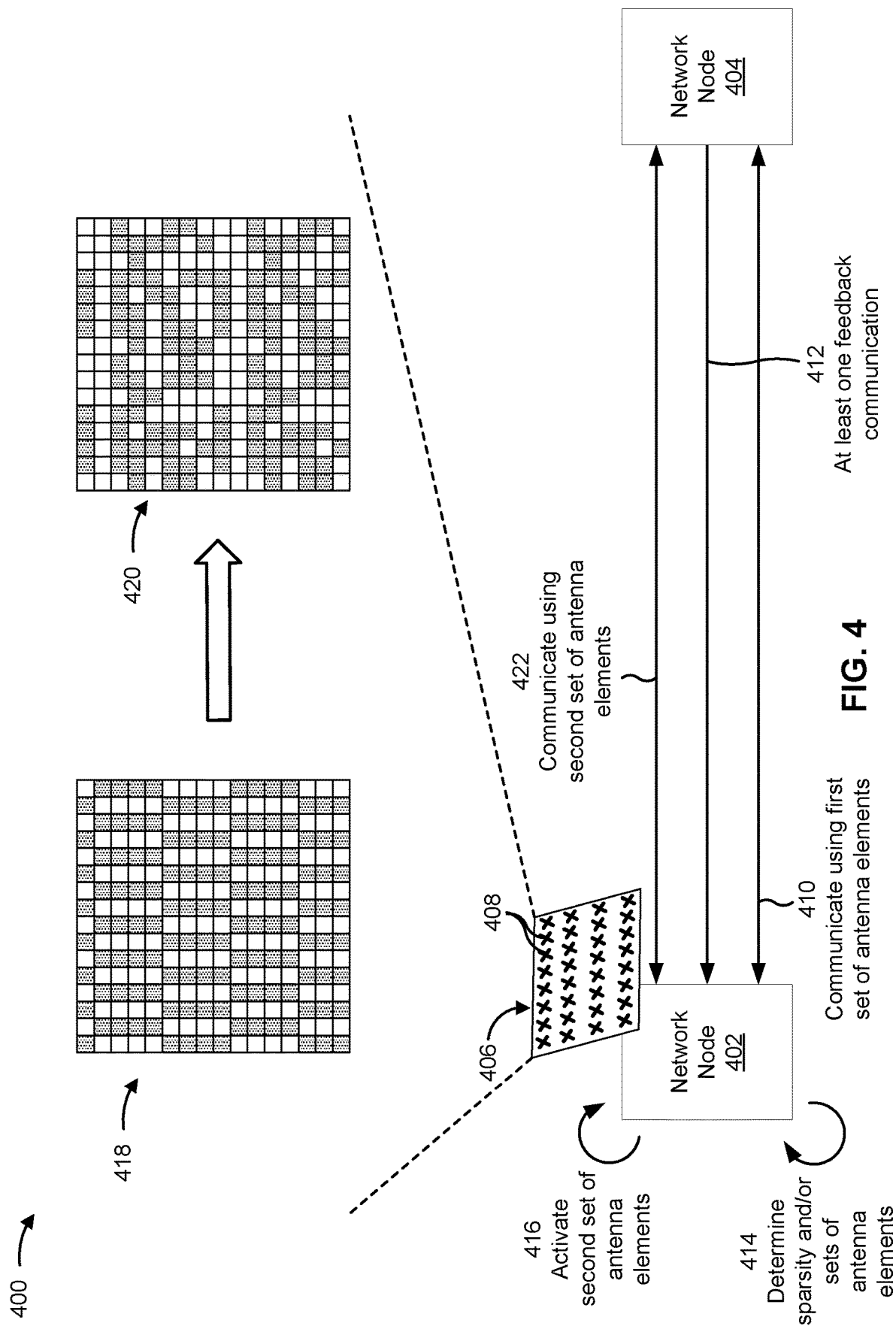
FIG. 4 is a diagram illustrating an example of dynamic antenna set switching, in accordance with the present disclosure.

FIG. 4 is a diagram illustrating an example 400 of dynamic antenna set switching, in accordance with the present disclosure. As shown in FIG. 4, a network node 402 and a network node 404 may communicate with one another. The network node 402 and/or the network node 404 may be, be similar to, include, or be included in, the network node 110 depicted in FIGS. 1 and 2, the UE 120 depicted in FIGS. 1 and 2, and/or one or more of the components of the disaggregated base station 300 depicted in FIG. 3. In the example 400, the network node 402 includes an antenna array 406 having antenna elements 408.

As shown by reference number 410, the network node 402 may communicate (e.g., with the network node 404) using a first set of active antenna elements 408 of the antenna array 406. The network node 402 may communicate using the first set of active antenna elements during a first time period. As shown by reference number 412, the network node 404 may transmit, and the network node 402 may receive, at least one feedback communication. The at least one feedback communication may be indicative of interference information associated with the network node 402. In some aspects, the interference information may explicitly indicate interference measurements, and in some other aspects, the interference information may indicate one or more signal measurements (e.g., RSRP, RSRQ, and/or signal-to-noise ratio (SNR), among other examples) from which interference measurements may be derived.

As shown by reference number 414, the network node 402 may determine a second set of antenna elements and/or a sparsity associated with a dynamic antenna set switching scheme. In some aspects, the network node 402 may determine the second set of antenna elements based on the interference information. In some aspects, the network node 402 may determine the first set of antenna elements and/or any additional sets of antenna elements based on interference information received from network nodes with which the network node 402 communicates. In some aspects, the network node 402 may determine the sparsity (e.g., the fraction of the active number of antenna elements relative to the total available number of antenna elements) associated with the dynamic antenna set switching scheme based on the interference information.

In some aspects, the network node 402 may determine at least one dynamic antenna set switching parameter based on a condition associated with a time-average of interference measurements associated with the network node. The at least one dynamic antenna set switching parameter may indicate a time-scale at which a set of interference measurements satisfies an interference threshold. The at least one dynamic antenna set switching parameter may indicate an interference threshold. In some aspects, the at least one dynamic antenna set switching parameter may indicate a time-scale associated with switching from the first set of antenna elements to the second set of antenna elements. In some aspects, the at least one dynamic antenna set switching parameter may indicate a power overhead associated with switching from the first set of antenna elements to the second set of antenna elements.

As shown by reference number 416, the network node 402 may activate the second set of active antenna elements. The network node 402 may activate the second set of active antenna elements based on the dynamic antenna set switching scheme. For example, as shown by reference number 418, the first set of active antenna elements (shown as shaded boxes) may have a first pattern and, as shown by reference number 420, the second set of active antenna elements may have a second pattern. The first and second sets of active antenna elements may be configured such that the second set of active antenna elements includes at least one active antenna element not included in the first set. The first and second sets of active antenna elements may be configured such that a difference between a first main lobe property of a first set of main lobe properties corresponding to the first set of active antenna elements and a second main lobe property of a second set of main lobe properties corresponding to the second set of active antenna elements satisfies a main lobe threshold (e.g., is less than or equal to a threshold difference value). The first and second sets of active antenna elements may be configured such that a difference between a first side lobe property of a first set of side lobe properties corresponding to the first set of active antenna elements and a second side lobe property of a second set of side lobe properties corresponding to the second set of active antenna elements satisfies a side lobe threshold (e.g., is greater than a threshold difference value or values). The main lobe properties and/or side lobe properties may be directional information associated with a lobe (e.g., angle of arrival, angle of departure), and/or performance metrics, associated with a lobe, indicative of beamforming gain, power, antenna gain, and/or effective isotropic radiated power (EIRP), among other examples.

As shown by reference number 422, the network node 402 may communicate (e.g., with the network node 404) using the second set of active antenna elements. The network node 402 may communicate using the second set of active antenna elements during a second time period. In some aspects, the network node 402 may activate at least one additional set of active antenna elements of the antenna array based on the dynamic antenna set switching scheme. The at least one additional set may include at least one active antenna element not included in the first set or the second set. In some aspects, the first set of active antenna elements consists of a first quantity of antenna elements and the second set of active antenna elements consists of a second quantity of antenna elements, and the first quantity is equal to the second quantity. In some aspects, each set of active antenna elements that is activated may include the same quantity of antenna elements as the prior set of activated antenna elements. In some aspects, increasing the number of switches to new sets of activated antenna elements may result in additional interference mitigation based on the time-averaging of the side lobe properties.

As indicated above, FIG. 4 is provided as an example. Other examples may differ from what is described with respect to FIG. 4.

Figure 5:
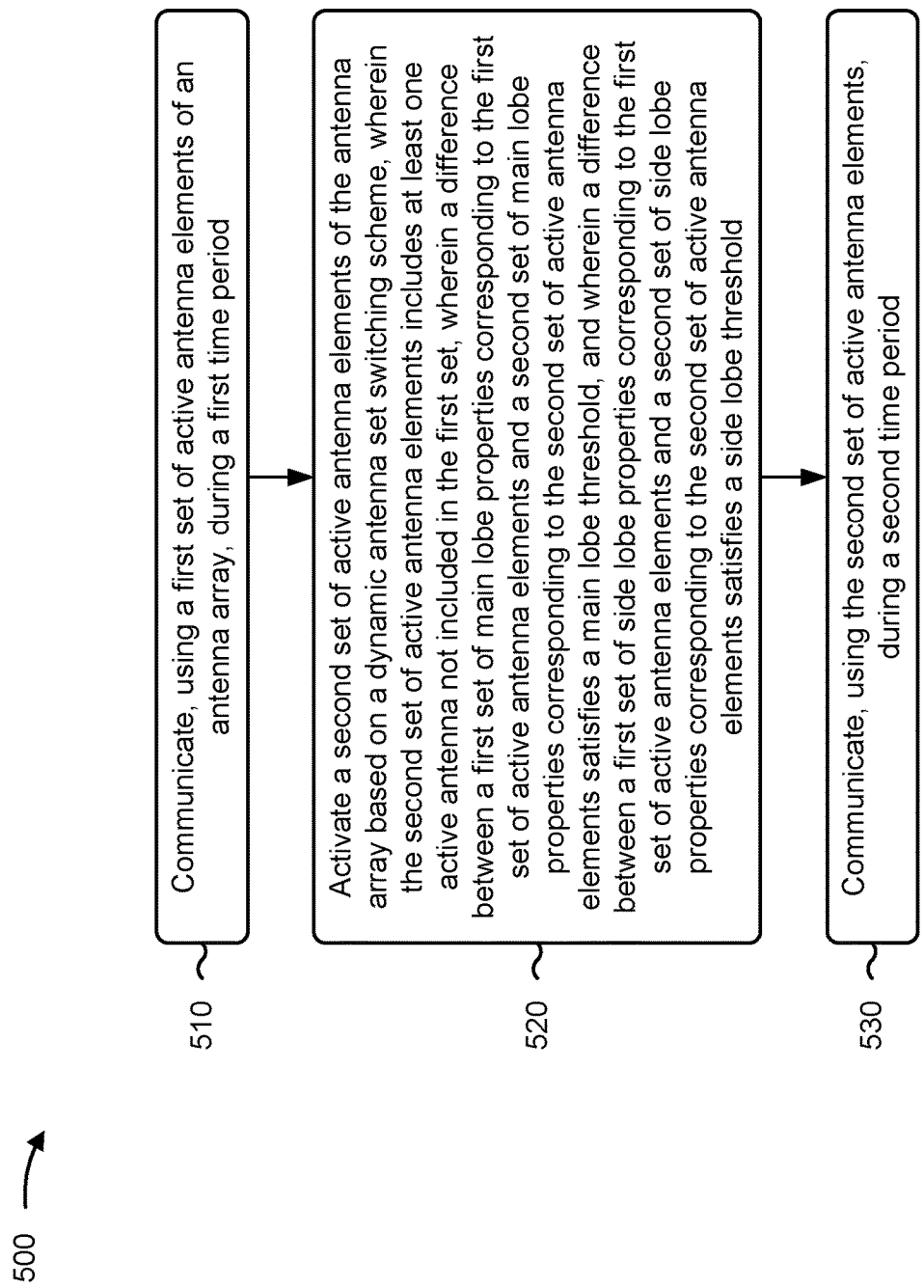
FIG. 5 is a diagram illustrating an example process performed, for example, by a network node, in accordance with the present disclosure.

FIG. 5 is a diagram illustrating an example process 500 performed, for example, by a network node, in accordance with the present disclosure. Example process 500 is an example where the network node (e.g., network node 402) performs operations associated with dynamic antenna set switching.

As shown in FIG. 5, in some aspects, process 500 may include communicating, using a first set of active antenna elements of an antenna array, during a first time period (block 510). For example, the network node (e.g., using communication manager 608, reception component 602, and/or transmission component 604, depicted in FIG. 6) may communicate, using a first set of active antenna elements of an antenna array, during a first time period, as described above.

As further shown in FIG. 5, in some aspects, process 500 may include activating a second set of active antenna elements of the antenna array based on a dynamic antenna set switching scheme, wherein the second set of active antenna elements includes at least one active antenna element not included in the first set, wherein a difference between a first main lobe property of a first set of main lobe properties corresponding to the first set of active antenna elements and a second main lobe property of a second set of main lobe properties corresponding to the second set of active antenna elements satisfies a main lobe threshold, and wherein a difference between a first side lobe property of a first set of side lobe properties corresponding to the first set of active antenna elements and a second side lobe property of a second set of side lobe properties corresponding to the second set of active antenna elements satisfies a side lobe threshold (block 520). For example, the network node (e.g., using communication manager 608 and/or activation component 610, depicted in FIG. 6) may activate a second set of active antenna elements of the antenna array based on a dynamic antenna set switching scheme, wherein the second set of active antenna elements includes at least one active antenna element not included in the first set, wherein a difference between a first main lobe property of a first set of main lobe properties corresponding to the first set of active antenna elements and a second main lobe property of a second set of main lobe properties corresponding to the second set of active antenna elements satisfies a main lobe threshold, and wherein a difference between a first side lobe property of a first set of side lobe properties corresponding to the first set of active antenna elements and a second side lobe property of a second set of side lobe properties corresponding to the second set of active antenna elements satisfies a side lobe threshold, as described above.

As further shown in FIG. 5, in some aspects, process 500 may include communicating, using the second set of active antenna elements, during a second time period (block 530). For example, the network node (e.g., using communication manager 608, reception component 602, and/or transmission component 604, depicted in FIG. 6) may communicate, using the second set of active antenna elements, during a second time period, as described above.

Process 500 may include additional aspects, such as any single aspect or any combination of aspects described below and/or in connection with one or more other processes described elsewhere herein.

In a first aspect, process 500 includes activating at least one additional set of active antenna elements of the antenna array based on the dynamic antenna set switching scheme, wherein the at least one additional set includes at least one active antenna element not included in the first set or the second set. In a second aspect, alone or in combination with the first aspect, the first set of active antenna elements consists of a first quantity of antenna elements and the second set of active antenna elements consists of a second quantity of antenna elements, and the first quantity is equal to the second quantity.

In a third aspect, alone or in combination with one or more of the first and second aspects, process 500 includes determining at least one of the first set of antenna elements or the second set of antenna elements. In a fourth aspect, alone or in combination with one or more of the first through third aspects, process 500 includes determining a sparsity associated with the dynamic antenna set switching scheme. In a fifth aspect, alone or in combination with one or more of the first through fourth aspects, process 500 includes receiving at least one feedback communication indicative of interference information associated with the network node.

In a sixth aspect, alone or in combination with the fifth aspect, process 500 includes determining at least one of the first set of antenna elements or the second set of antenna elements based on the interference information. In a seventh aspect, alone or in combination with one or more of the fifth or sixth aspects, process 500 includes determining a sparsity associated with the dynamic antenna set switching scheme based on the interference information.

In an eighth aspect, alone or in combination with one or more of the first through seventh aspects, process 500 includes determining at least one dynamic antenna set switching parameter based on a condition associated with a time-average of interference measurements associated with the network node.

In a ninth aspect, alone or in combination with the eighth aspect, the at least one dynamic antenna set switching parameter indicates a time scale at which a set of interference measurements satisfies an interference threshold. In a tenth aspect, alone or in combination with one or more of the eighth or ninth aspects, the at least one dynamic antenna set switching parameter indicates an interference threshold. In an eleventh aspect, alone or in combination with one or more of the eighth through tenth aspects, the at least one dynamic antenna set switching parameter indicates a time scale associated with switching from the first set of antenna elements to the second set of antenna elements. In a twelfth aspect, alone or in combination with one or more of the eighth through eleventh aspects, the at least one dynamic antenna set switching parameter indicates a power overhead associated with switching from the first set of antenna elements to the second set of antenna elements.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
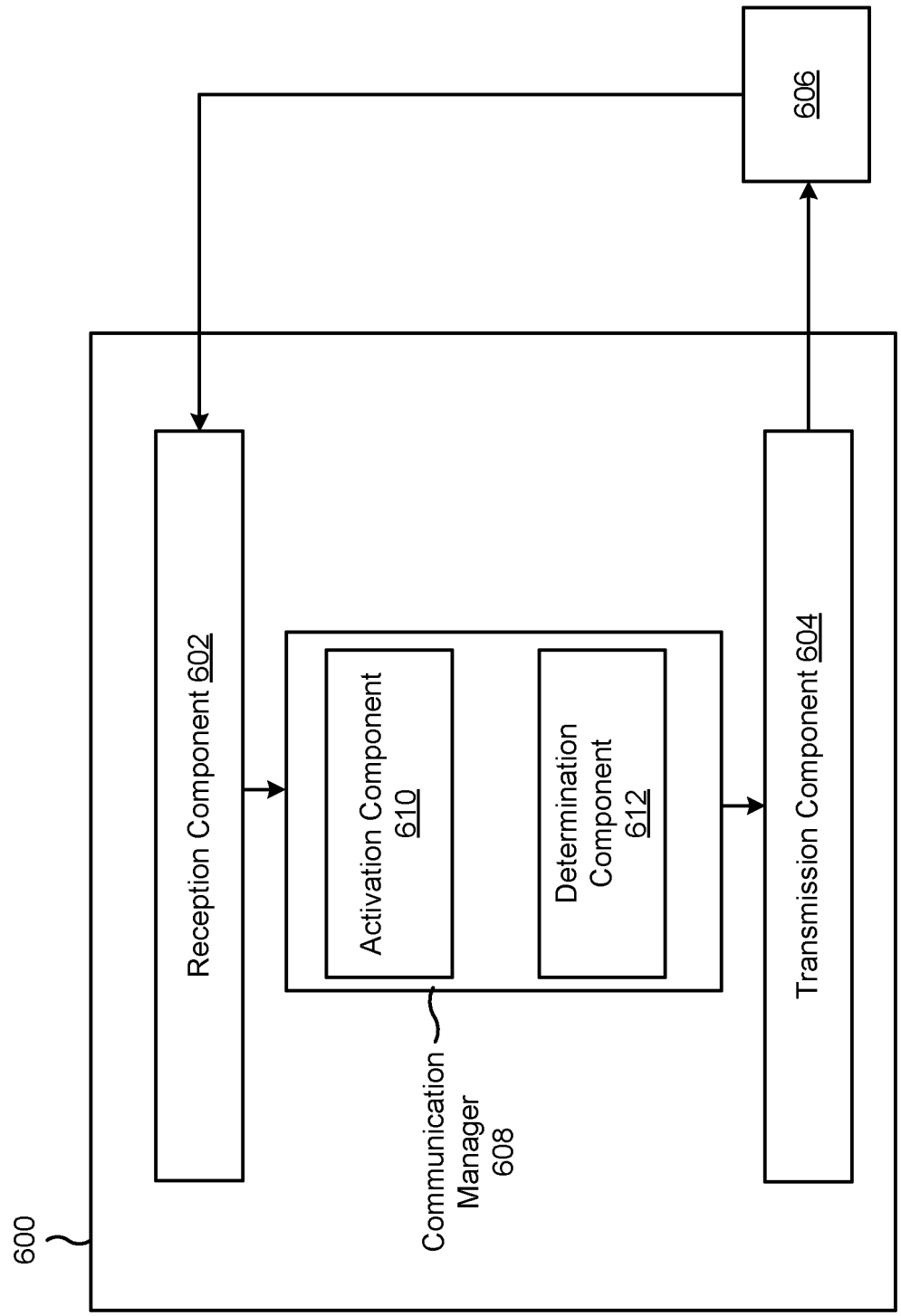
FIG. 6 is a diagram of an example apparatus for wireless communication, in accordance with the present disclosure.

FIG. 6 is a diagram of an example apparatus 600 for wireless communication, in accordance with the present disclosure. The apparatus 600 may be a network node, or a network node may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include a communication manager 608. The communication manager 608 may include an activation component 610 and/or a determination component 612, among other examples.

In some aspects, the apparatus 600 may be configured to perform one or more operations described herein in connection with FIG. 4. Additionally, or alternatively, the apparatus 600 may be configured to perform one or more processes described herein, such as process 500 of FIG. 5. In some aspects, the apparatus 600 and/or one or more components shown in FIG. 6 may include one or more components of the network node described in connection with FIG. 2. Additionally, or alternatively, one or more components shown in FIG. 6 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 600. In some aspects, the reception component 602 may include one or more antennas, a modem, a demodulator, a MIMO detector, a receive processor, a controller/processor, a memory, or a combination thereof, of the UE and/or the network node described in connection with FIG. 2.

The transmission component 604 may transmit communications, such as reference signals, control information, data communications, or a combination thereof, to the apparatus 606. In some aspects, one or more other components of the apparatus 600 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modem, a modulator, a transmit MIMO processor, a transmit processor, a controller/processor, a memory, or a combination thereof, of the UE and/or the network node described in connection with FIG. 2. In some aspects, the transmission component 604 may be co-located with the reception component 602 in a transceiver.

In some examples, means for transmitting, outputting, or sending (or means for outputting for transmission) may include one or more antennas, a modulator, a transmit MIMO processor, a transmit processor, or a combination thereof, of the UE and/or the network node described above in connection with FIG. 2.

In some examples, means for receiving (or means for obtaining) may include one or more antennas, a demodulator, a MIMO detector, a receive processor, or a combination thereof, of the UE and/or the network node described above in connection with FIG. 2.

In some cases, rather than actually transmitting, for example, signals and/or data, a device may have an interface to output signals and/or data for transmission (a means for outputting). For example, a processor may output signals and/or data, via a bus interface, to an RF front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

In some examples, means for determining and/or activating may include various processing system components, such as a receive processor, a transmit processor, a controller/processor, a memory, or a combination thereof, of the UE and/or the network node described above in connection with FIG. 2.

The communication manager 608, the reception component 602, and/or the transmission component 604 may communicate, using a first set of active antenna elements of an antenna array, during a first time period. In some aspects, the communication manager 608 may include one or more antennas, a modem, a controller/processor, a memory, or a combination thereof, of the UE and/or the network node described in connection with FIG. 2. In some aspects, the communication manager 608 may include the reception component 602 and/or the transmission component 604. In some aspects, the communication manager 608 may be, be similar to, include, or be included in, the communication manager 140 and/or the communication manager 150 depicted in FIGS. 1 and 2.

The communication manager 608 and/or the activation component 610 may activate a second set of active antenna elements of the antenna array based on a dynamic antenna set switching scheme, wherein the second set of active antenna elements includes at least one active antenna element not included in the first set, wherein a difference between a first main lobe property of a first set of main lobe properties corresponding to the first set of active antenna elements and a second main lobe property of a second set of main lobe properties corresponding to the second set of active antenna elements satisfies a main lobe threshold, and wherein a difference between a first side lobe property of a first set of side lobe properties corresponding to the first set of active antenna elements and a second side lobe property of a second set of side lobe properties corresponding to the second set of active antenna elements satisfies a side lobe threshold. In some aspects, the activation component 610 may include one or more antennas, a modem, a controller/processor, a memory, or a combination thereof, of the UE and/or the network node described in connection with FIG. 2. In some aspects, the activation component 610 may include the reception component 602 and/or the transmission component 604.

The communication manager 608, the reception component 602, and/or the transmission component 604 may communicate, using the second set of active antenna elements, during a second time period. The communication manager 608 and/or the activation component 610 may activate at least one additional set of active antenna elements of the antenna array based on the dynamic antenna set switching scheme, wherein the at least one additional set includes at least one active antenna element not included in the first set or the second set.

The communication manager 608 and/or the determination component 612 may determine at least one of the first set of antenna elements or the second set of antenna elements. In some aspects, the determination component 612 may include one or more antennas, a modem, a controller/processor, a memory, or a combination thereof, of the UE and/or the network node described in connection with FIG. 2. In some aspects, determination component 612 may include the reception component 602 and/or the transmission component 604. The communication manager 608 and/or the determination component 612 may determine a sparsity associated with the dynamic antenna set switching scheme.

The communication manager 608 and/or the reception component 602 may receive at least one feedback communication indicative of interference information associated with the network node. The communication manager 608 and/or the determination component 612 may determine at least one of the first set of antenna elements or the second set of antenna elements based on the interference information. The communication manager 608 and/or the determination component 612 may determine a sparsity associated with the dynamic antenna set switching scheme based on the interference information. The communication manager 608 and/or the determination component 612 may determine at least one dynamic antenna set switching parameter based on a condition associated with a time-average of interference measurements associated with the network node.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

The following provides an overview of some Aspects of the present disclosure:

Aspect 1: A method of wireless communication performed by an apparatus at a network node, comprising: communicating, using a first set of active antenna elements of an antenna array, during a first time period; activating a second set of active antenna elements of the antenna array based on a dynamic antenna set switching scheme, wherein the second set of active antenna elements includes at least one active antenna element not included in the first set, wherein a difference between a first main lobe property of a first set of main lobe properties corresponding to the first set of active antenna elements and a second main lobe property of a second set of main lobe properties corresponding to the second set of active antenna elements satisfies a main lobe threshold, and wherein a difference between a first side lobe property of a first set of side lobe properties corresponding to the first set of active antenna elements and a second side lobe property of a second set of side lobe properties corresponding to the second set of active antenna elements satisfies a side lobe threshold; and communicating, using the second set of active antenna elements, during a second time period.

Aspect 2: The method of Aspect 1, further comprising activating at least one additional set of active antenna elements of the antenna array based on the dynamic antenna set switching scheme, wherein the at least one additional set includes at least one active antenna element not included in the first set or the second set.

Aspect 3: The method of either of Aspects 1 or 2, wherein the first set of active antenna elements consists of a first quantity of antenna elements and the second set of active antenna elements consists of a second quantity of antenna elements, and wherein the first quantity is equal to the second quantity.

Aspect 4: The method of any of Aspects 1-3, further comprising determining at least one of the first set of antenna elements or the second set of antenna elements.

Aspect 5: The method of any of Aspects 1-4, further comprising determining a sparsity associated with the dynamic antenna set switching scheme.

Aspect 6: The method of any of Aspects 1-5, further comprising receiving at least one feedback communication indicative of interference information associated with the network node.

Aspect 7: The method of Aspect 6, further comprising determining at least one of the first set of antenna elements or the second set of antenna elements based on the interference information.

Aspect 8: The method of either of Aspects 6 or 7, further comprising determining a sparsity associated with the dynamic antenna set switching scheme based on the interference information.

Aspect 9: The method of any of Aspects 1-8, further comprising determining at least one dynamic antenna set switching parameter based on a condition associated with a time-average of interference measurements associated with the network node.

Aspect 10: The method of Aspect 9, wherein the at least one dynamic antenna set switching parameter indicates a time scale at which a set of interference measurements satisfies an interference threshold.

Aspect 11: The method of either of Aspects 9 or 10, wherein the at least one dynamic antenna set switching parameter indicates an interference threshold.

Aspect 12: The method of any of Aspects 9-11, wherein the at least one dynamic antenna set switching parameter indicates a time scale associated with switching from the first set of antenna elements to the second set of antenna elements.

Aspect 13: The method of any of Aspects 9-12 wherein the at least one dynamic antenna set switching parameter indicates a power overhead associated with switching from the first set of antenna elements to the second set of antenna elements.

Aspect 12: An apparatus for wireless communication at a device, comprising a processor; memory coupled with the processor; and instructions stored in the memory and executable by the processor to cause the apparatus to perform the method of one or more of Aspects 1-11.

Aspect 13: A device for wireless communication, comprising a memory and one or more processors coupled to the memory, the one or more processors configured to perform the method of one or more of Aspects 1-11.

Aspect 14: An apparatus for wireless communication, comprising at least one means for performing the method of one or more of Aspects 1-11.

Aspect 15: A non-transitory computer-readable medium storing code for wireless communication, the code comprising instructions executable by a processor to perform the method of one or more of Aspects 1-11.

Aspect 16: A non-transitory computer-readable medium storing a set of instructions for wireless communication, the set of instructions comprising one or more instructions that, when executed by one or more processors of a device, cause the device to perform the method of one or more of Aspects 1-11.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A network node for wireless communication, comprising:
    a memory; and
    one or more processors, coupled to the memory, configured to:
        communicate, using a first set of active antenna elements of an antenna array, during a first time period;
        activate a second set of active antenna elements of the antenna array based on a dynamic antenna set switching scheme, wherein the second set of active antenna elements includes at least one active antenna element not included in the first set, wherein a difference between a first main lobe property of a first set of main lobe properties corresponding to the first set of active antenna elements and a second main lobe property of a second set of main lobe properties corresponding to the second set of active antenna elements satisfies a main lobe threshold, and wherein a difference between a first side lobe property of a first set of side lobe properties corresponding to the first set of active antenna elements and a second side lobe property of a second set of side lobe properties corresponding to the second set of active antenna elements satisfies a side lobe threshold; and
        communicate, using the second set of active antenna elements, during a second time period.

2. The network node of claim 1, wherein the one or more processors are further configured to activate at least one additional set of active antenna elements of the antenna array based on the dynamic antenna set switching scheme, wherein the at least one additional set includes at least one active antenna element not included in the first set or the second set.

3. The network node of claim 1, wherein the first set of active antenna elements consists of a first quantity of antenna elements and the second set of active antenna elements consists of a second quantity of antenna elements, and wherein the first quantity is equal to the second quantity.

4. The network node of claim 1, wherein the one or more processors are further configured to determine at least one of the first set of antenna elements or the second set of antenna elements.

5. The network node of claim 1, wherein the one or more processors are further configured to determine a sparsity associated with the dynamic antenna set switching scheme.

6. The network node of claim 1, wherein the one or more processors are further configured to receive at least one feedback communication indicative of interference information associated with the network node.

7. The network node of claim 6, wherein the one or more processors are further configured to determine at least one of the first set of antenna elements or the second set of antenna elements based on the interference information.

8. The network node of claim 6, wherein the one or more processors are further configured to determine a sparsity associated with the dynamic antenna set switching scheme based on the interference information.

9. The network node of claim 1, wherein the one or more processors are further configured to determine at least one dynamic antenna set switching parameter based on a condition associated with a time-average of interference measurements associated with the network node.

10. The network node of claim 9, wherein the at least one dynamic antenna set switching parameter indicates a time scale at which a set of interference measurements satisfies an interference threshold.

11. The network node of claim 9, wherein the at least one dynamic antenna set switching parameter indicates an interference threshold.

12. The network node of claim 9, wherein the at least one dynamic antenna set switching parameter indicates a time scale associated with switching from the first set of antenna elements to the second set of antenna elements.

13. The network node of claim 9, wherein the at least one dynamic antenna set switching parameter indicates a power overhead associated with switching from the first set of antenna elements to the second set of antenna elements.

14. A method of wireless communication performed by an apparatus at a network node, comprising:
communicating, using a first set of active antenna elements of an antenna array, during a first time period;
activating a second set of active antenna elements of the antenna array based on a dynamic antenna set switching scheme, wherein the second set of active antenna elements includes at least one active antenna element not included in the first set, wherein a difference between a first main lobe property of a first set of main lobe properties corresponding to the first set of active antenna elements and a second main lobe property of a second set of main lobe properties corresponding to the second set of active antenna elements satisfies a main lobe threshold, and wherein a difference between a first side lobe property of a first set of side lobe properties corresponding to the first set of active antenna elements and a second side lobe property of a second set of side lobe properties corresponding to the second set of active antenna elements satisfies a side lobe threshold; and
communicating, using the second set of active antenna elements, during a second time period.

15. The method of claim 14, further comprising activating at least one additional set of active antenna elements of the antenna array based on the dynamic antenna set switching scheme, wherein the at least one additional set includes at least one active antenna element not included in the first set or the second set.

16. The method of claim 14, wherein the first set of active antenna elements consists of a first quantity of antenna elements and the second set of active antenna elements consists of a second quantity of antenna elements, and wherein the first quantity is equal to the second quantity.

17. The method of claim 14, further comprising determining at least one of the first set of antenna elements or the second set of antenna elements.

18. The method of claim 14, further comprising determining a sparsity associated with the dynamic antenna set switching scheme.

19. The method of claim 14, further comprising receiving at least one feedback communication indicative of interference information associated with the network node.

20. The method of claim 19, further comprising determining at least one of the first set of antenna elements or the second set of antenna elements based on the interference information.

21. The method of claim 19, further comprising determining a sparsity associated with the dynamic antenna set switching scheme based on the interference information.

22. The method of claim 14, further comprising determining at least one dynamic antenna set switching parameter based on a condition associated with a time-average of interference measurements associated with the network node.

23. The method of claim 22, wherein the at least one dynamic antenna set switching parameter indicates a time scale at which a set of interference measurements satisfies an interference threshold.

24. The method of claim 22, wherein the at least one dynamic antenna set switching parameter indicates an interference threshold.

25. The method of claim 22, wherein the at least one dynamic antenna set switching parameter indicates a time scale associated with switching from the first set of antenna elements to the second set of antenna elements.

26. The method of claim 22, wherein the at least one dynamic antenna set switching parameter indicates a power overhead associated with switching from the first set of antenna elements to the second set of antenna elements.

27. A non-transitory computer-readable medium storing a set of instructions for wireless communication, the set of instructions comprising:
one or more instructions that, when executed by one or more processors of a network node, cause the network node to:
communicate, using a first set of active antenna elements of an antenna array, during a first time period;
activate a second set of active antenna elements of the antenna array based on a dynamic antenna set switching scheme, wherein the second set of active antenna elements includes at least one active antenna element not included in the first set, wherein a difference between a first main lobe property of a first set of main lobe properties corresponding to the first set of active antenna elements and a second main lobe property of a second set of main lobe properties corresponding to the second set of active antenna elements satisfies a main lobe threshold, and wherein a difference between a first side lobe property of a first set of side lobe properties corresponding to the first set of active antenna elements and a second side lobe property of a second set of side lobe properties corresponding to the second set of active antenna elements satisfies a side lobe threshold; and
communicate, using the second set of active antenna elements, during a second time period.

28. The non-transitory computer-readable medium of claim 27, wherein the one or more instructions are further configured to cause the network node to activate at least one additional set of active antenna elements of the antenna array based on the dynamic antenna set switching scheme, wherein the at least one additional set includes at least one active antenna element not included in the first set or the second set.

29. An apparatus for wireless communication, comprising:
- means for communicating, using a first set of active antenna elements of an antenna array, during a first time period;
- means for activating a second set of active antenna elements of the antenna array based on a dynamic antenna set switching scheme, wherein the second set of active antenna elements includes at least one active antenna element not included in the first set, wherein a difference between a first main lobe property of a first set of main lobe properties corresponding to the first set of active antenna elements and a second main lobe property of a second set of main lobe properties corresponding to the second set of active antenna elements satisfies a main lobe threshold, and wherein a difference between a first side lobe property of a first set of side lobe properties corresponding to the first set of active antenna elements and a second side lobe property of a second set of side lobe properties corresponding to the second set of active antenna elements satisfies a side lobe threshold; and
- means for communicating, using the second set of active antenna elements, during a second time period.

30. The apparatus of claim 29, further comprising means for activating at least one additional set of active antenna elements of the antenna array based on the dynamic antenna set switching scheme, wherein the at least one additional set includes at least one active antenna element not included in the first set or the second set.

* * * * *